United States Patent
Mendez

(10) Patent No.: US 6,797,300 B2
(45) Date of Patent: Sep. 28, 2004

(54) COMPOSITION FOR PRESERVING FRESH CUT FLOWERS, FRESH FRUITS AND VEGETABLES WITHOUT THE USE OF REFRIGERATION

(76) Inventor: Alejandro Mendez, P.O. Box 523271, Miami, FL (US) 33152

(*) Notice: Subject to any disclaimer, the term of this patent is extended or adjusted under 35 U.S.C. 154(b) by 0 days.

(21) Appl. No.: 10/123,989

(22) Filed: Apr. 16, 2002

(65) Prior Publication Data

US 2002/0164406 A1 Nov. 7, 2002

Related U.S. Application Data

(63) Continuation-in-part of application No. 09/669,235, filed on Sep. 25, 2000, now abandoned, which is a continuation of application No. 09/274,168, filed on Mar. 23, 1999, now Pat. No. 6,123,968.

(51) Int. Cl.[7] .............................................. A23L 3/3463
(52) U.S. Cl. ......................... 426/321; 426/52; 426/61; 426/310; 426/333; 426/335; 426/429; 426/615; 426/616; 426/655
(58) Field of Search .......................... 426/52, 321, 61, 426/310, 333, 335, 429, 615, 616, 655

(56) References Cited

U.S. PATENT DOCUMENTS

| | | | |
|---|---|---|---|
| 3,424,593 A | | 1/1969 | Bockman et al. |
| 3,944,537 A | | 3/1976 | Saunders et al. |
| 4,352,746 A | * | 10/1982 | Bracco et al. .............. 252/398 |
| 5,792,461 A | | 8/1998 | Bok |
| 6,123,968 A | * | 9/2000 | Mendez ...................... 426/321 |
| 6,299,915 B1 | * | 10/2001 | Nussinovitch et al. ........ 426/89 |

FOREIGN PATENT DOCUMENTS

JP          0822407          9/1996

* cited by examiner

Primary Examiner—Helen Pratt
(74) Attorney, Agent, or Firm—Kevin P. Crosby, Esq.; Daniel C. Crilly, Esq.; Brinkley, McNerney et al.

(57) ABSTRACT

A method of producing and using a solution, and the solution itself, for extending the shelf life of fresh flowers, fruits and vegetables after they are harvested which includes the steps of extracting juice from the flowers, flowering plant parts, fruits or vegetables, filtering the juice, disintegrating the parts from which the juice is extracted, extracting an enzyme or enzymes from the parts using a solvent without the denaturing the enzymes, removing the parts and mixing the remaining ingredients with the extracted juice.

17 Claims, 6 Drawing Sheets

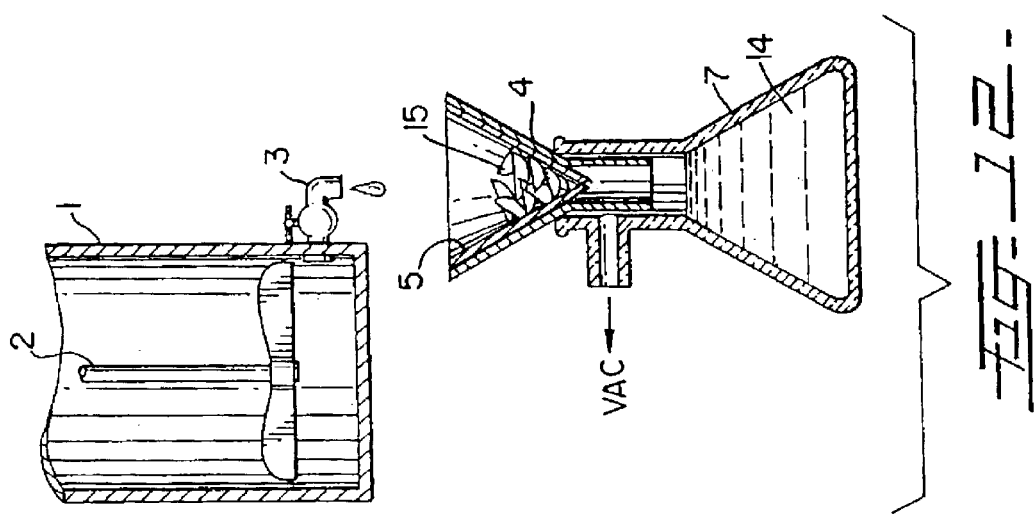
FIG-12-
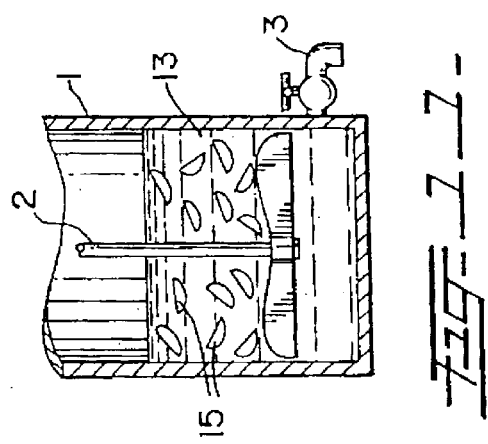
FIG-11-
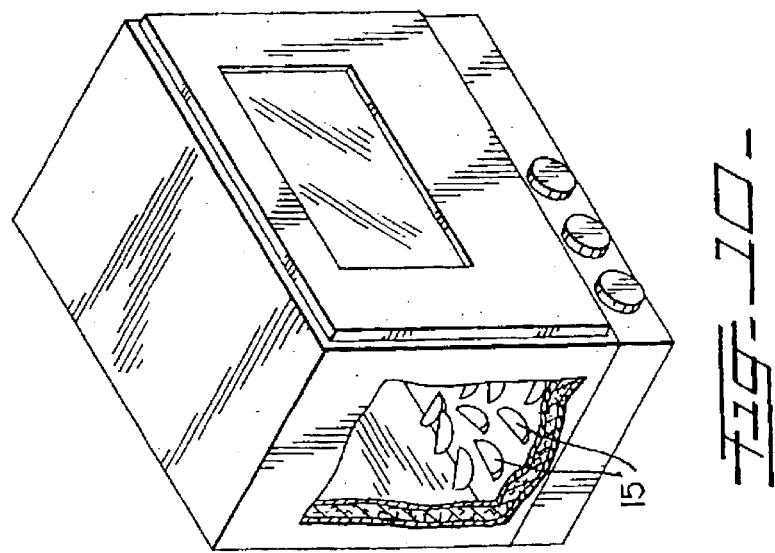
FIG-10-

COMPOSITION FOR PRESERVING FRESH CUT FLOWERS, FRESH FRUITS AND VEGETABLES WITHOUT THE USE OF REFRIGERATION

REFERENCE TO RELATED APPLICATIONS

This application is a continuation in-part of application Ser. No. 09/669,235, filed Sep. 25, 2000, now abandoned which is a continuation of application Ser. No. 09/274,168, filed Nov. 23, 1999 now U.S. Pat. No. 6,123,968.

BACKGROUND OF THE INVENTION

1. Field of the Invention

The field of the invention is fresh cut flowers, fresh fruits and vegetables, and methods and compositions for maintaining their freshness and shelf life without refrigeration.

2. Description of Related Art

Since the beginning of mankind, agriculture has always played a major role in the everyday life of man particularly to fresh fruits and vegetables that are easily harvested. Modern agriculture has increased productivity in agriculture but has never reduced the huge losses in the post-harvest of fresh fruits and vegetables. These post-harvest losses are not new; they have always been a problem for mankind. In these days of rapidly enlarging populations in the poorest countries whose food supply is already short, the problem of post-harvest loses of fresh fruits and vegetables has become increasingly critical. Currently these post-harvest loses amount to thirty-five percent (35%) in industrialized countries to seventy percent (70%) in under developed countries.

In the early days of horticulture in today s industrialized countries, heavy losses occurred in much the same manner as they do today in developing countries. Increasing industrialization in technologically-advanced nations gradually brought improvements in crop handling. Elaborate harvesting equipment replaced the crude harvesting tools. Collection centers were strategically established in major producing areas. Containers were remodeled to add more protection to the fresh fruits and vegetables. Commercial storage plants were installed and grade standards adopted. Engineers and economists became more and more aware of raw material behavior. Advances in refrigeration technology in the developed countries made possible the establishment of cold chains for the entire post-harvest and handling operations. At the institutional level, post-harvest research was initiated. Pilot packing houses were installed, coupled with the development on intensive training programs. The improvement of product quality and reduction in post-harvest losses became the main concern of producers, middleman, marketing specialists and consumers. Today, enormous volumes of quality horticultural fruit and vegetable crops produced in technologically advanced countries are made available to millions of people through improved post-harvest handling. Thus, historically and by necessity, post-harvest technology is part of the normal development processes in agriculture.

These handling processes are not fully recognized in less-developed countries. In such countries, agriculture may be characterized as disjointed. Production is not linked with marketing. With highly perishable crops like fruits and vegetables, storage, packing, transport, and handling technologies are practically non-existent. Hence, considerable amounts of fresh fruits and vegetables are lost after harvest. Post-harvest, loss-prevention technology measures have become more important than ever.

It is distressing to note that so much time is being devoted to the culture of plants, so much money spent on irrigation, fertilization, and crop protection measures, only to be wasted about a week after harvest. It is, therefore, important that post-harvest technology and processes be given much more attention than current production practices.

Fresh fruits and vegetables have many similarities with respect to their compositions, methods of cultivation and harvesting, storage properties, and processing. In fact, many vegetables may be considered fruit in the true botanical sense. Botanically, fruits are those portions of the plant which house seeds. Therefore, such items as tomatoes, cucumbers, eggplants, peppers and others would be classified as fruits on this basis. However, the important distinction between fruit and vegetables has come rather to be made on usage basis. Those plant items that are generally eaten with the main course of a meal are considered to be "vegetables". Those that are commonly eaten as dessert are considered "fruits". This artificial distinction is made by the food processor, certain marketing laws, and the consuming public. Fruit contains natural acids, such as citric acid in oranges and lemons, malic acid of apples, and tartaric acid of grapes. These acids give the fruits tartness and slow down bacterial spoilage. Organic acids also influence the color of fruits since many plant pigments are natural pH indicators. Carbohydrates are the main component of fruits and vegetables and represent 90% of their dry matter. Water is also present in fruits (between 80 to 90%) and in vegetables (generally, between 90 to 96%). More mineral substances are present in vegetables than in fruits; but enzymes that are present in all fresh fruits and vegetables are the biological catalyst that promote most of the biochemical reactions which occur in fresh fruits and vegetables.

Some properties of enzymes in fresh fruits and vegetables are the following.

1. In living fresh fruits and vegetables, enzymes control the reactions associated with ripening.
2. After harvest (unless destroyed by heat, chemicals, or some other means), enzymes continue the ripening process. In many cases, fruit ripens to the point of spoilage, such as soft melons or overripe bananas.
3. Because enzymes enter into a vast number of biochemical reactions in fresh fruits and vegetables, enzymes may be responsible for changes in flavor, color, texture, and nutritional properties.
4. The heating processes in fresh fruits and vegetables manufacturing and processing are designed not only to destroy micro-organisms, but also to deactivate enzymes and so improve the fruits and vegetables storage stability.

Once the fruit or vegetable has left the tree, the organoleptic properties, nutritional value, safety, and aesthetic appeal of the fruit deteriorates in varying degrees. The major causes of deterioration include the following:

(a) growth and activity of micro-organisms;
(b) activities of the natural food enzymes;
(c) insects, parasites, and rodents;
(d) temperature, both heat and cold;
(e) moisture and dryness;
(f) air and in particular oxygen;
(g) light; and
(h) time.

The rate at which foods spoil, if proper measures are not taken, is indicated in table 1.0 below. The table shows the time in days of the generalized storage life at seventy degrees Fahrenheit (70° F.) with a normal humidity of 60%.

| FOOD PRODUCTS | GENERALIZED STORAGE LIFE (DAYS) AT 21 C. (70 F.) |
|---|---|
| Animal flesh, fish, poultry | 1–2 |
| Dried, salted, smoked meat and fish | 360 and more |
| Fruits | 1–7 |
| Dried fruits | 360 and more |
| Leafy vegetables | 1–2 |
| Root crops | 7–20 |
| Fresh cut flowers | 1–2 |

Flowers are a colored, sometimes scented, part of a plant that contains its reproductive organs. It consists of a leafy shoot with modified leaves, petals, and sepals surrounding male or female organs, stamens, and pistils. There are about 200,000 species of flowers, classified in many different families. However, only about 1,000 flowers are used commercially worldwide due to the short shelf life associated with them. The most common uses are horticultural, ornamental and as gifts (such as roses), gastronomical reasons (such as lettuce and artichoke), or as vegetable oil (like sunflower oil). Flowers are grouped into an inflorescence (flower cluster) called the head, or capitulum, which resembles, and functions as, a single flower. The flowers within the head are called florets. There are two types of florets. The first, called a disc floret, has a tubular corolla (set of petals) with equal lobes. The second type, called a ligulate or ray floret, has one side of the corolla tube extended at the apex to form a long, petal-like strap. The calyx (floral envelope) that surrounds the individual floret in a head is usually reduced to a ring of scales or bristles called the pappus, which often aids the distribution of seeds. In the common dandelion and thistles the pappus consists of fine bristles that enable the fruit to float through the air. In other species it is barbed, causing the fruit to stick to passers-by. The anthers (pollen-producing parts) are joined to form a tube through which the style (part of the female flower part) extends. The anthers release the pollen into the tube, and as the style elongates it pushes the pollen upward out of the tube, making it available to insect pollinators or to wind dispersal. The stigmas (pollen-receiving areas) of the style are located on two branches of the style tip, and these branches separate after elongation. Thus, self-pollination is usually avoided, although in some instances pollen travels backwards into the pollen-bearing anther tube to allow this to occur. The pistil (female flower part), which has a single ovary, bears the other flower parts on its apex. After fertilization it matures into a hard-coated fruit that bears a single seed. Plants like humans also have need for water. If flowers do not receive water, they will and ultimately due. For some plants, such as tomatoes, a quick watering revives them within a few minutes to an hour, whereas more sensitive plants may never recover. Unlike animals, plants do not have a rigid skeleton. Woody plants, such as trees and shrubs, have hardened cell walls with secondary growth to give them rigidity. Herbaceous plants, on the other hand, have very flexible cell walls which are rigid only when the plant's cells are filled with water. Animal cells under the same amount of internal pressure would burst, but plant cell walls are much stronger and easily withstand this pressure, which is called turgor pressure. In order to maintain turgor pressure plant cells need an ample supply of water. Plants continuously lose some of their water through a process called transpiration. Like all organisms, plants must breathe. Air is exchanged through small openings called stomata (stoma, singular), located on the undersides of leaves. Stomata can be opened or closed by a special pair of cells called guard cells. Unfortunately, not only does air pass in and out, but also water. On a hot day especially large amounts of water can be lost. If the plant is unable to replenish the water being lost the guard cells begin losing their turgor pressure. Soon thereafter, if water is still unavailable the plant wilts as many other cells begin losing their turgor pressure. There are many adaptations used by plants to prevent water loss than in addition to the simple approach of closing the stomata. One of the more familiar approaches is to store large amounts of water either in the stem, as in cactus or cacti, or in the leaves and stem, as in stonecrops (sedum) and other succulents. A natural waxy leaf covering is effective in preventing water loss in some plants. The common sagebrush, as well as a number of other desert and chaparral plants, often have dense, light colored hairs covering the leaves. This prevents not only water loss, but deflects some of the sun's heat, which can also prevent evaporation. Even more intricate mechanisms are used by some plants. The stonecrops and other members of the Crassulacea,e among a number of plants in other families, use a special type of photosynthesis called Crassulacian Acid Metabolism or CAM. This alternate photosynthetic mechanism allows the plant to open their stomata at night, while keeping them closed throughout the day, when water loss would be at worst. Still other plants simply avoid the whole water problem by either growing only when water is abundant (so-called ephemerals) or by becoming entirely aquatic as in pondweeds (Potamogetonaceae) or pond lilies (Nymphaeaceae). In fact, aquatic species occur in most flowering plant families. An specially big challenge for most plants is obtaining water from salty soil or saltwater. Very few plants can tolerate very much salt in their surroundings. First, molecules of any substance have a tendency to migrate from areas of high concentration to areas of low concentration. This phenomenon is called diffusion and is best observed by dropping a small amount of red food coloring into a glass of water. After a few hours, even without agitating the water at all, the food coloring diffuses evenly throughout the water. Water also diffuses from areas where there there is more water to areas where is less water. In water this process is referred to as osmosis. In saltwater there is less water per given volume then there is in pure water. If some pure water is separated from some saltwater by a membrane that allows just water to pass and not salt, and interesting phenomenon occurs. Water gradually flows from the pure waterside into the saltwater side. In fact, it will continue to flow, but when a moderate amount of pressure is applied the flow will stop, the amount of pressure required being a measure called osmotic pressure. We can apply this concept to what happens to a plant in wet soil. If the water in the soil is fairly pure, with only a small amount of salt and other dissolved material, water will tend to flow from the soil into the roots of the plant. This is because the water already in the plant root has a lot more solid matter dissolved in it and the water flows from the fairly pure soil water to the soupy water already in the root by osmosis. In salty soil the situation is reversed. The soil water now has more dissolved in it than the water in the root and osmosis is reversed. Water flows out of the root into the soil. As a result the plant wilts and eventually dies from lack of water, even though there may be large amounts of water around. Some plants have adaptations which allow them to survive in the presence of large amounts of salt. Surf grass and eel grass (both Zosteraceae) are two flowering plants that actually live submerged in saltwater, keeping the salt concentrations in their leaves and roots fairly similar to the surrounding seawater. Mangroves comprise a large number of species whose roots are bathed in saltwater as well. Others, like pickleweed, can tolerate even higher levels of salt found in the twice-daily exposed soils of the salt marsh. They accomplish this feat by keeping salt concentrations within their stem and roots even higher than the surrounding water in the salt marsh soils. Saltgrass, a little less tolerant, survives the high salt concentrations in soils above the high tide line by excreting salt on the surfaces of their leaves. Other plants, less salt tolerant, are still capable of surviving in soils that are deadly to most plants. Plant breeders are very interested in how halophytes deal with salty soil. It is hoped that some of the genes responsible for salt tolerance will be located so that they can be put into important crop plants. If important crop plants could be developed to have salt tolerance, many currently unusable land could be farmed. Irrigated land gradually builds up salt and eventually becomes unusable, and such genetically engineered plants could prolong the life of irrigated land. Most cactus do come from warm weather low rainfall areas of the world although there are exceptions. There are no known fossils of cactus, and it is not known with certainty when they developed the unique adaptations that enable them to live in the harsh environments that many of them survive in. Many scientists believe that the cactus developed their physiological traits in response to changing climatic conditions several million years ago. The major traits that people see when they first observe cactus is the abundance of spines in many species. These spines serve several uses. They guard against most browsing herbiverous animals by making the plant difficult and dangerous to chew. The spines also help to shade the plant, helping keep internal heat down. Finally the spines also can channel the infrequent rains to the base of the plant. Another easily identified characteristic of many cactus is a waxy coating that surrounds the plant over the skin, which often has a bluish cast to it, and may be damaged by careless handling. This is called a glaucus bloom and helps to reduce evaporation by the plant. This holds in more of the precious moisture so rare in the desert. All advanced plants have leaf holes called stomata. These holes are what open to permit entry and exit of various gases and moistures. Un cactus these stomata close tighter than in most plants further reducing the loss of moisture in the heat of the day. Another thing that cactus can do is to store up lots of water when it does fall. Many have the ability to open themselves up accordion style to hold massive amounts of water. Then when the plant is losing water, the pleats of the accordion fold up shading the plant more and reducing surface area exposed to the sun. When the plant is stressed and not getting enough water it will often bend over as the hygroscopic (water filled) pressure inside the plant diminishes. The hygroscopic pressure is what holds the plant up erect. As it lessens the plant loses its rigidity and can no longer stand erect. As it bends over its exposure to the sun is reduced, much of it is shaded by the overhead portion such that moisture loss is further lessened. Root behavior is another adaptation that cactus have made in order to live. They tend to have roots that spread laterally for quite a ways and may exist in a suspended state until the rains activate them, a small amount of moisture will cause the feeding roots to quickly grow out from the main roots. These feeders bring in the water and its dissolved minerals and nutrients. After the rain is gone and as the soil dries these feeder roots die and disappear enabling the plant to live on its stored water without having to spend energy and moisture keeping these roots alive that may not be needed for many, many months. The above mentioned main characteristics of flowers are relevant to the reader to understand the purpose of this invention and the principles taught in my U.S. Pat. No. 6,123,968. The instant invention is to a process to create a composition, and the resulting composition for extending the shelf life of fresh cut flowers and fresh fruits and vegetables without the use of refrigeration. Fresh cut flowers, like fresh fruits and vegetables are also lost in enormous quantities worldwide once they are severed from the mother plant, i.e. harvested. Thus, there is clearly a worldwide need for the present invention in that it is going to dramatically reduce, and in some cases eliminate the need for refrigeration between harvest and consumption.

As soon as produce is harvested, the processes leading to breakdown begin, and cannot then be stopped; the rate at which breakdown occurs can, however, be slowed to minimize losses. The most common commercial methods to slow down the enzymatic processes follow:

1. Refrigeration at all points of receiving, distributing, and retailing the fresh fruit, flowering plants and vegetables. Although, this is a very expensive method, it is the most common. Only 15 to 20% of all harvested fruits, flowering plants and vegetables use refrigeration.
2. Care to prevent cutting or bruising of the fruit, flowers and/or vegetables during picking or handling.
3. Packaging or storage to control respiration rate and ripening of fruits, flowers and vegetables.
4. Use of preservatives to kill micro-organisms on the fruits, flowering plants and vegetables. In other words, fungicides are applied as food waxes and other applied substances to supposedly improve the appeal of the fruits, flowers and vegetables with consumers.

Fruits can be classified as climacteric and non-climacteric. Climacteric and non-climacteric refers to two distinct patterns of ripening. In non-climacteric fruits the process of maturation and ripening is a continuous but gradual process. In contrast, climacteric fruits undergo a rapid ripening phase when triggered by enzymatic changes. The onset of climacteric ripening is thus a well-defined event marked by rapid increase in the rate of respiration and the natural evolution of ethylene gas by the fruit at a point in its development known as the respiratory climacteric. The importance of the respiratory climacteric is that fruits such as bananas may be held at a reasonable temperature when in the green state, but, as they begin to ripen, they will rapidly increase their respiration and generate much more heat. The consequence may be that this heating cannot be controlled and even more respiration will occur in a chain reaction, rapidly leading to spoilage of the fruit in a very short time. Once climacteric fruits start to ripen, very little can be done except to market them for immediate consumption. Ethylene is present in all fruit and is recognized as the central fruit ripening hormone which, in climacteric fruits, can actually initiate ripening when present at concentrations as low as one-tenth to ten parts per million (0.1–10 ppm).

Non-climacteric fruits also respond to ethylene application by increasing their respiration rate. However, the actual ripening process is triggered by the fruit itself. As well as being involved in ripening and increasing the respiration in fruits, ethylene also plays an important role in all plant materials and is produced in response to stress from wounds and injuries. In other words, ethylene produced by wounding or stressing may also trigger ripening in the damaged fruit as well as the undamaged fruits around it. Damage one green fruit in a box and the whole box load may ripen prematurely.

For this reason, good ventilation of fresh fruits with fresh air, refrigerated if necessary, is vital to ensure that ethylene levels do not build up to significant levels during storage and transport. Ethylene can also adversely affect certain vegetables. Carrots for example develop bitter flavors. Parsley and other leafy herbs will rapidly wilt when exposed to ethylene in stores and during retail display. Table 1.1 gives listings of common climacteric and non-climacteric fruit and vegetable fruits.

|  | CLIMACTERIC | NON-CLIMACTERIC |
|---|---|---|
| TEMPERATE FRUIT |  |  |
|  | Apple | Cherry |
|  | Pear | Grape |
|  | Peach | Strawberry |
|  | Apricot |  |
|  | Plum |  |
| VEGETABLE FRUIT |  |  |
|  | Melon | Cucumber |
|  | Tomato |  |
|  | Watermelon |  |
| COMMON TROPICAL FRUIT |  |  |
|  | Avocado | Orange |
|  | Banana | Grapefruit |
|  | Mango | Lemon |
|  | Papaya | Lime |
|  | Fig | Olive |
|  | Guava | Pineapple |
|  | Passion fruit | Litchi |
|  | Persimmon |  |
| LESS COMMON TROPICAL FRUIT |  |  |
|  | Cherimoya | Cashew apple |
|  | Soursop | Java plum |
|  | Breadfruit | Other Eugenia sp |
|  | Jackfruit |  |

For all of the above-mentioned reasons and facts, the huge losses of fresh fruits and vegetables are a worldwide problem that needs to be solved with an inexpensive and simple method of application. Thus, there is clearly the worldwide need for the present application in that it is going to create an impact as large as the introduction of refrigeration to the worldwide, fresh fruit and vegetable industry.

SUMMARY OF THE INVENTION

The invention applies a process that naturally the enzymatic processes of ripening that occur in all fresh flowers, fruits and vegetables. The invention encompasses methods of making solutions, the solutions themselves, and the methods of using the solutions.

The invention also applies a process that naturally extends the shelf life without much water usage and without much moisture and also without the use of refrigeration for fresh cut flowers and fresh fruits and vegetables once they have been removed from the mother plant.

The naturally-occurring process being harnessed is the retarding of ripening in flowers/flowering plants, fruits and vegetables. Enzymes are protein catalysts that regulate chemical reactions in flowers/flowering plants, fruits and vegetables. Fruits and vegetables contain enzymes that advance ripening. Flowers/flowerings plants, fruits and vegetables also contain enzymes that retard ripening. The enzymes that advance and the enzymes that retard tend to offset each other. In most flowers/flowering plants, fruits and vegetables, both types of enzymes are present. An object of the invention is to harness and/or re-create the effect of the enzymes that retard ripening. Another object of the invention is to reduce or eliminate the effects of the enzymes that advance ripening.

In certain flowers/flowering plants, fruits and vegetables, the ratio of positive enzymes versus negative enzymes is greater than one. The flowers/flowering plants, fruits and vegetables with greater ratios are better suited for raw materials used to prepare the solution. Examples of fruits having greater ratios are limes, garlic, and onions. The following fruits and vegetables have been found to have produced efficacious solutions: limes, oranges, grapefruits, lemons, tangerines, pineapples, onions, and garlic. Cactus solutions made from combinations of the above-listed fruits and vegetables also work. The best time to process the fruits and vegetables to make a solution is when the fruits and vegetables have just ripened.

Also, some of the natural ingredients of the solution made out of fresh lime peels are very effective in controlling or killing surface bacteria, mold, and yeast which also can shorten the lifetime of the fruit.

Also, the naturally-found ingredient, d-limonene, is an excellent insect repellent. D-limonene is in relatively-high concentrations in limes. This also will increase the lifetime of the fresh fruit due to a lessening of the susceptibility of the skin to attack. Flying insects rarely attack a lime tree or the limes within the lime tree because they contain d-limonene.

The fruit enzymes are responsible for the many changes to the color, the odor, the taste, and the ripening of the fresh fruits. Once these enzymes become neutralized by other enzymes, the shelf life of the fresh fruits and vegetables can be extended from three to eight weeks depending on the fruit. The metabolism of the fruit will slow down by about 90%, causing the ripening and decaying process to slow down.

A method of producing the solution involves the following steps. First, the juice is extracted from the a part or parts of the plant, fruit or vegetable. Next, the juice is filtered. Next, any remaining parts are disintegrated. Next, the enzymes in the disintegrated parts are extracted with a solvent. The solvent should be chosen by its ability to dissolve as much of the enzymes as possible, while not dissolving the other flower, fruit or vegetable components. The solvent should not denature the enzyme. A ten-percent (10%) aqueous ethylalcohol solution is an example of a suitable solvent. Next, the disintegrated parts should be stirred in the solution allowing for full absorption of the enzymes into the solvent. Next, the solution and any disintegrated parts should be separated by a suitable method such as filtering. Next, the juices separated earlier can be added to the solution. The amount of dilution is governed by factors such as the method of application and the type of flower, fruit or vegetable being protected. Next, color agent (s) can be added to the solution to improve the solution aesthetically. Next, a wax or other application can be dissolved into the solution. The wax agent helps the application of the solution to the flower, fruit or vegetable and its adhesion to the flower, fruit or vegetable. Next, the solution can be quality controlled. In quality control, the amount of enzymes can be verified as well as any other ingredients. In addition, during quality control, the amount of contaminants can be verified. Finally, the solution is packaged for use or distribution. Because the solution utilizes plant enzymes that denature at around one hundred-thirty degrees Fahrenheit (130° F.), the process of making the solution is always done near room temperatures. The results retain ninety to ninety-five percent (90–95%) of the enzymes that are found in the natural state of the extracted flower, fruit or vegetable.

In accordance with these and other objects which will become apparent hereinafter, the instant invention will now be described with particular reference to the accompanying drawings.

BRIEF DESCRIPTION OF THE DRAWINGS

FIG. 10 is a side, partial-cutaway view showing the interior of a vacuum oven as plant parts/flowers or peels are being dried.

FIG. 11 is a side cutaway view showing a solution using dried plant parts, flowers or peels.

FIG. 12 is a side cutaway view showing the solution separated from the plant parts, flowers or peels.

DETAILED DESCRIPTION OF THE PREFFERD EMBODIMENTS

Like in certain kinds of fresh fruits and vegetables, in flowers too the ratio of positive enzymes versus negative enzymes is greater than one. The flowers with greater ratios are better suited to be raw materials used to prepare the solution of this invention. Examples of flowers having greater ratios are: Cactus, or any member of the Cacti family, Stonecrops or any member of the Crassulaceae family, Pondweeds or any other member of the Potamogetonaceae family, Pond Lilies or any other member of the Nymphaeaceae family, Surf grass and eel grass or any other member of the Zosteraceae family, and also any member of the Pickleweed family.

Figure 13:
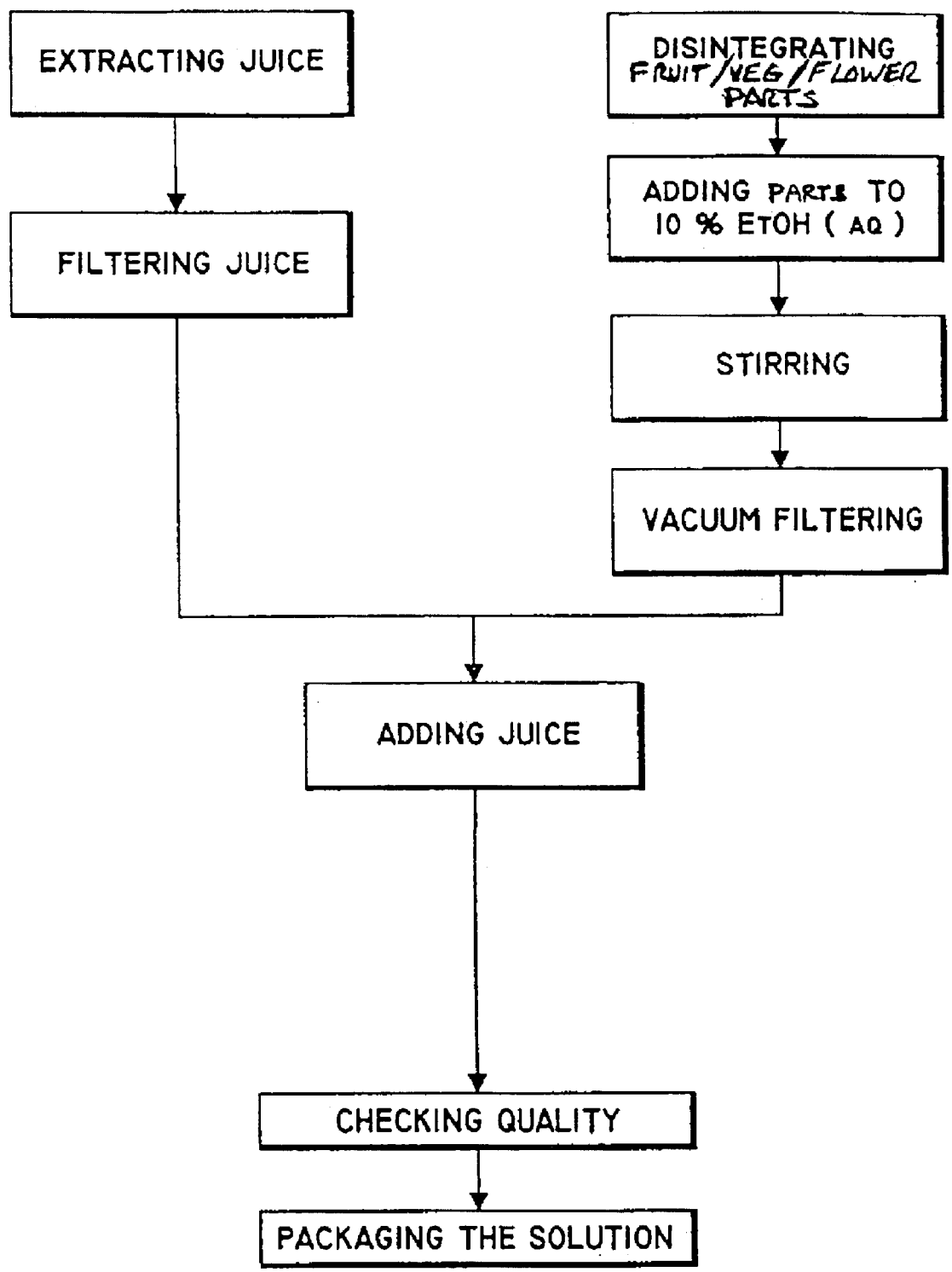
FIG. 13 is a flow chart of a method of making a solution that preserves fresh cut flowers, fresh fruits and vegetables.

One inventive method, depicted in FIG. 13, is producing a solution made out of fresh cut cactus flowers and parts of the cactus plant or any of the other members of the cactus family or the other plant families mentioned above, either together or independently. This method involves the extraction of the natural juices out of the whole flowers or out of the plant parts or out of both the flowers and the part plants together. The extraction can be done either by disintegration or by applying pressure to squeeze the juices out of the flowers or the plant parts. Next the juice is filtered, and then the enzymes are extracted by solvent out of the juice using a solvent that will not damage the enzymes. Next, the enzyme-containing solution resulting from the step of removing the enzymes from the juice is mixed with filtered water and an application (e.g. wax) that will make it easy to apply to the surface of any kind of fresh cut flowers, fresh fruits and vegetables that are commercially sold in the worldwide markets.

Another method is deformulating the solutions made out of either fresh fruits and vegetable peels, fresh flowers and plant parts of any of the families named above for fresh fruits and vegetables and flowers and flowering plant parts and then isolating in the lab the enzymes responsible for the harnessing (i.e. the retardation of the decay of the flower, fruit or vegetable) of the other enzymes present in the fresh fruits and vegetables, and any kind of fresh cut flowers. Next these enzymes are reproduced artificially and they may be suspended in a powder that will be mixed with a solvent such as water and later applied to the surface of any kind of fresh fruits, vegetables and fresh cut flowers that are commercially sold worldwide.

Figure 1:
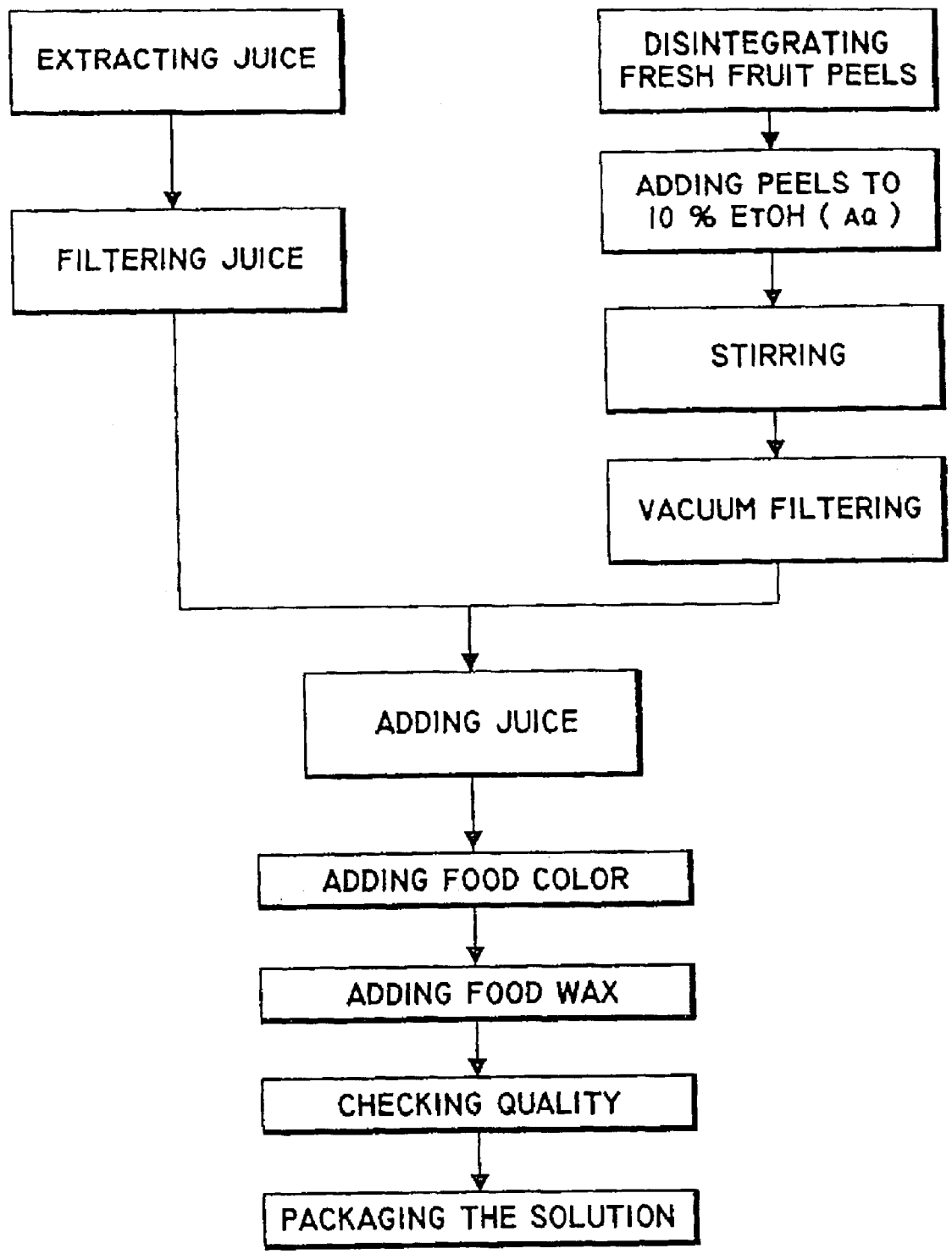
FIG. 1 is a flow chart of a method of making a solution that preserves flowers, fruits and vegetables.

Another method to create this solution out of fresh peels of fruits and vegetables, shown in FIG. 1, follows: removing the peels from said fruits and vegetables; drying the peels; extracting the enzymes from the peels in a suitable solvent such as a ten-percent (10%) aqueous ethyl-alcohol solution; and separating the peels from the solution. The resulting solution is relatively weak compared to the solution made by the previous process. However, the solution made from dried peels is still efficacious. The solution produced can be used similarly to the previous solution but cannot be diluted as much as the previous solution because the concentration of enzymes is not as great.

The invention includes the solution made by the previous methods.

As an alternative to the afore-mentioned process for creating the compositions of the instant invention, the enzymes are responsible for the retardation in the decay and/or deterioration of flowers, fruits and vegetables can be either directly extracted from the flowers/plants, fruits and/or vegetables or created through either means, e.j. genetic engineering, chemical composition(s), etc.

The method of applying the solution is very simple. After the fresh fruits, flowers and vegetables are washed at the picking source, they are put into a bath of this solution for a period of one minute, dried, and then packed for sale or distribution according to the following chart:

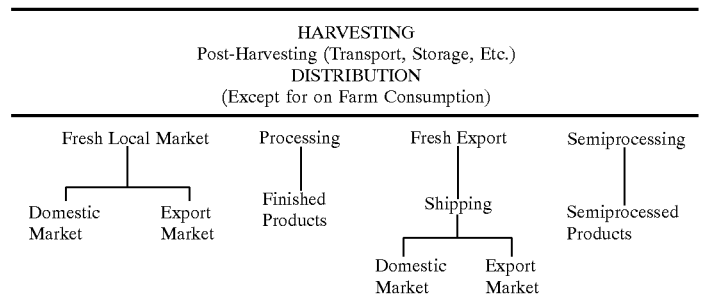

HARVESTING
Post-Harvesting (Transport, Storage, Etc.)
DISTRIBUTION
(Except for on Farm Consumption)

Fresh Local Market — Processing — Fresh Export — Semiprocessing

Domestic Market / Export Market — Finished Products — Shipping (Domestic Market / Export Market) — Semiprocessed Products This chart shows that the application of this natural solution made out of fresh peels, flower or plant parts has to be at the source (at the farms) and not at the distribution centers. The reason for the earlier application of the solution is because many fruits, vegetable and/or flowers may have already been damaged, e.g. bruised before reaching the distribution center.

The results obtained with this solution without the use of refrigeration at a room temperature of approximately seventy-eight degrees Fahrenheit (78° F.) and at a normal humidity of sixty percent (60%) are summarized in the following table:

| 1. Tomatoes | 4 to 8 weeks |
|---|---|
| 2. Bananas | 3 to 6 weeks |
| 3. Grapes | 3 to 6 weeks |
| 4. Apples | 3 to 6 weeks |
| 5. Pineapples | 3 to 6 weeks |
| 6. Oranges | 4 to 6 weeks |
| 7. Grapefruits | 4 to 6 weeks |
| 8. Tangerines | 4 to 6 weeks |
| 9. Plums | 4 to 6 weeks |
| 10. Peaches | 4 to 6 weeks |
| 11. Papayas | 3 to 6 weeks |
| 12. Mangos | 4 to 6 weeks |
| 13. Apricots | 4 to 6 weeks |
| 14. Nectarines | 4 to 6 weeks |
| 15. Plantains | 3 to 6 weeks |
| 16. Pears | 4 to 6 weeks |
| 17. Potatoes | 4 to 8 weeks |
| 18. Tobacco Leaves | 4 to 8 weeks |
| 19. Fresh Cut flowers | 4 to 6 weeks |

A series of solutions, each made from fresh disintegrated vegetable or fruit peels or flowers or flowering plant parts, creates an effect with different duration on shelf life of these products.

Generally, for fruits and vegetables, the best results were achieved by the lime peel solution. Another highly effective solution was made out of fresh peels of onions. Fresh peels of garlic displayed good results, too. For flowers, as stated above, cactus plants have yielded the best results.

This invention eliminates the huge losses experienced by the fruit, flower and vegetable industry to a level of five to ten percent (5–10%) since many products are lost post harvest due to bruising, exposure to the sun, sudden change of temperatures, and bad roads during transportation. Many losses are avoided with the application of the solutions of this invention.

The embodiment of this invention shown in FIG. 13 is directed to a process that slows down the natural enzymatic changes that occur in fresh flowers, fruits and vegetables after they are harvested. The process results in the extension of the shelf life of fresh flowers, fruits and vegetables for a prolonged period without the use of refrigeration. The process includes the following steps:

extracting the juice from the fresh flower, vegetable or fruit plant (or parts thereof) ("Parts") using a commercial juice extractor;

filtering immediately the juice, disintegrating the fresh Parts;

placing the disintegrated Parts into a receptacle containing approximately 10% aqueous ethyl alcohol solution;

stirring the ingredients until mixed; and vacuum filtering the ingredients or filtering using any other suitable filtration method;

adding the previously extracted fresh squeezed filtered juice in a ratio of approximately 5 to 1;

adding any desired color agent (not shown);

adding any FDA-approved application agent that can be diluted so that the final solution can be applied to the skin of fresh fruits and vegetables or to flowers without resistance (not shown);

conducting quality control checks for some or all of the following: brix counts, acidity, bacteria plate counts, enzyme plate counts, color, and odor, taste, texture, weight, sediments, citric acid, ascorbic acid, d-limonene, and ketones;

packing the solution in containers such as 5,000 gallon tankers or 55 gallon drums.

The above-described solution can be applied to flowers, fruits and vegetables to extend shelf life without refrigeration.

An example of this process is a method of making a solution of enzymes extracted from the dry peels of limes comprising the following steps: drying the peels in a vacuum oven at seventy degrees Celsius (70° C.); adding water and ethyl alcohol to the dry peels while keeping the mixture at sixty to seventy degrees Celsius (60° c.–700 c) for three hours; and then vacuum filtering. The resulting solution is relatively weak compared to the product made by the previous process but still effective. The results were eighty percent (80%) less effective than the solution obtained with the fresh disintegrated lime peels.

The invention is also to solutions made by the above-described preferred embodiments of the methods to make solutions.

The invention encompasses a method of extending shelf-life which includes adding the solution made to fruits, flowers and vegetables.

One embodiment of the invention encompasses a method of extending the shelf life of flowers, fruits and vegetables without refrigeration using the application of these other fresh peel fruit solutions to the fresh fruits and vegetables named above or using the application of solutions made from flowers and/or flowering plants to fresh flowers.

The invention also encompasses a method of extending shelf life without refrigeration comprising applying solutions created from plant parts to the fresh flowers, fruits and vegetables named above.

Alternatively, the invention encompasses solutions which mimic the performance and characteristics of naturally obtained solutions as described above, but which are created artificially, whether using man-made substances or natural substances, or a combination of both.

FIGS. 2–12 show one suitable embodiment of a process for creation of a solution for this invention, wherein a plurality of plant, flower, fruit or vegetable parts 10 are placed into a mixing receptacle 1 and are mixed by way of mixing element 2. Parts 10 are broken down mechanically by mixing element 2 in such a manner that a liquid Ouice) 12 is separated from the parts 10, and placed into a secondary receptacle 6 via drain 3.

Figure 3:
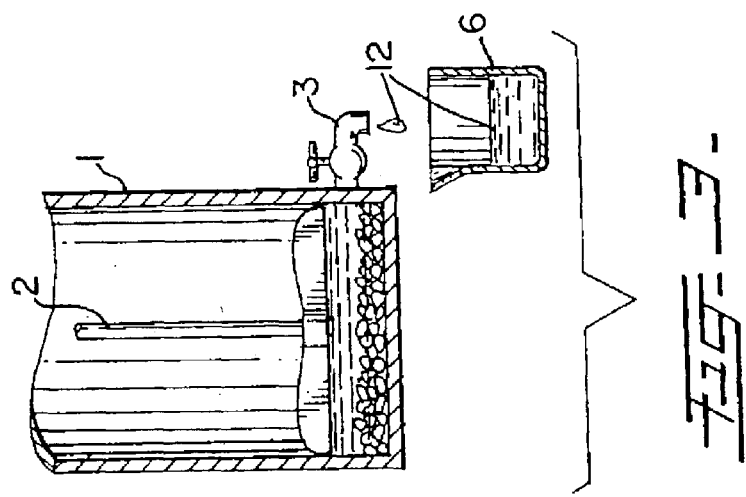
FIG. 3 is a side cutaway view of an extractor after extraction.
Figure 2:
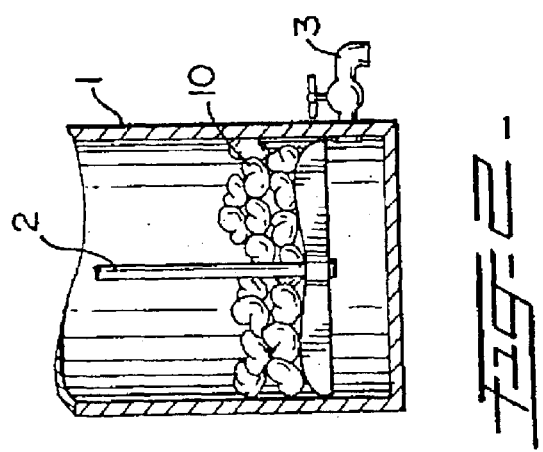
FIG. 2 is a side cutaway view of an extractor before extraction.

The juice 12 may or may not be filtered during this step (shown in FIG. 3).

Figure 4:
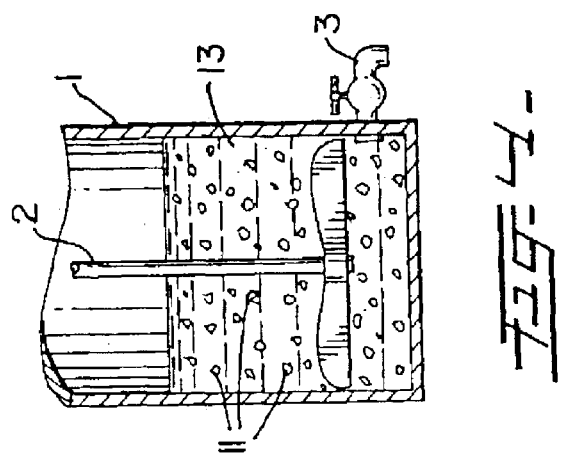
FIG. 4 is a side cutaway view of an extractor wherein the disintegrated plant parts/flowers or peel has been extracted in a solution.

FIG. 4 shows the step of disintegrating the juice-extracted parts 11 of flower, plant, vegetable or fruit parts 10 in a solution 13 as heretofore described. The disintegrated, flower or plant parts or vegetable or fruit parts, after being stirred in the solution of aqueous ethyl alcohol solution are stirred for a predetermined amount of time so that proper mixing occurs, and vacuum filters. The thus extracted solution 13 is dispensed via drain 3 into a tertiary receptacle 7 through the afore-described process.

Figure 7:
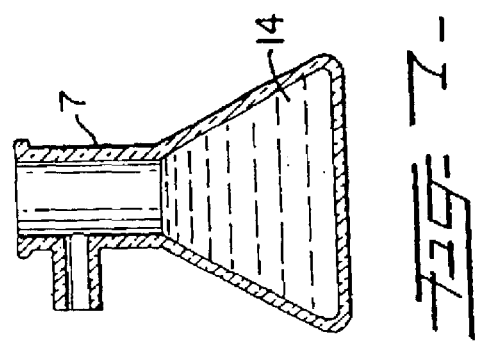
FIG. 7 is a side cutaway view of the solution made from the original extraction solution and the added juice.
Figure 6:
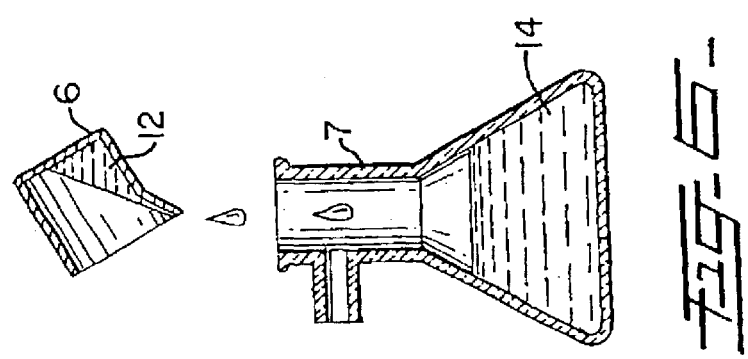
FIG. 6 is a side cutaway view showing the originally extracted juice being mixed with the solution.
Figure 5:
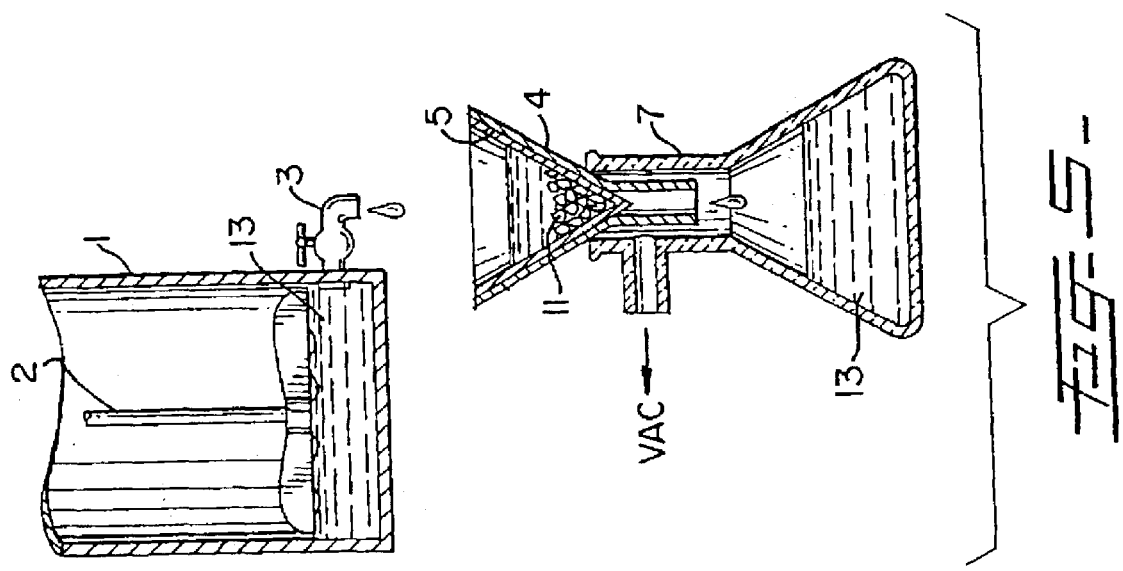
FIG. 5 is a side cutaway view of an extractor emptying into a vacuum filter wherein the solution is separated from any plant parts/flowers or peels.

As best seen in FIGS. 6 and 7, if desired coloring and solution application agents 12 can be added to tertiary receptacle 7 from receptacle 6 to yield resultant finished solution 14.

Figure 8:
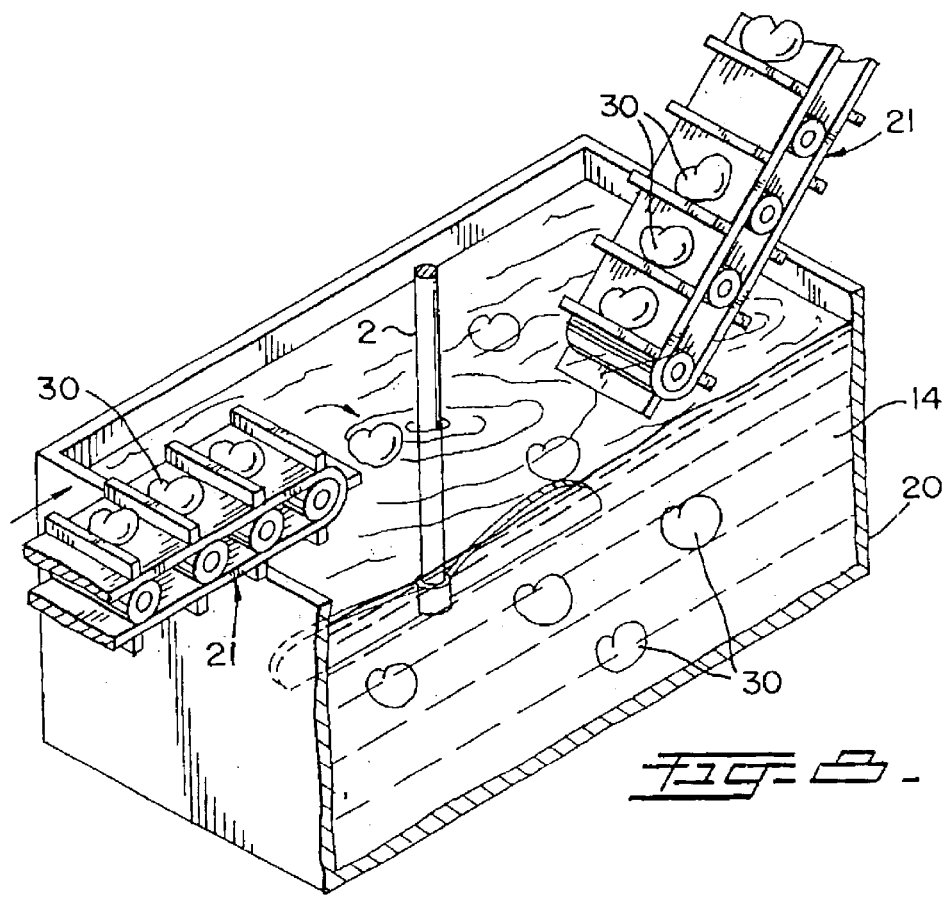
FIG. 8 is a side view of a vat application system.
Figure 9:
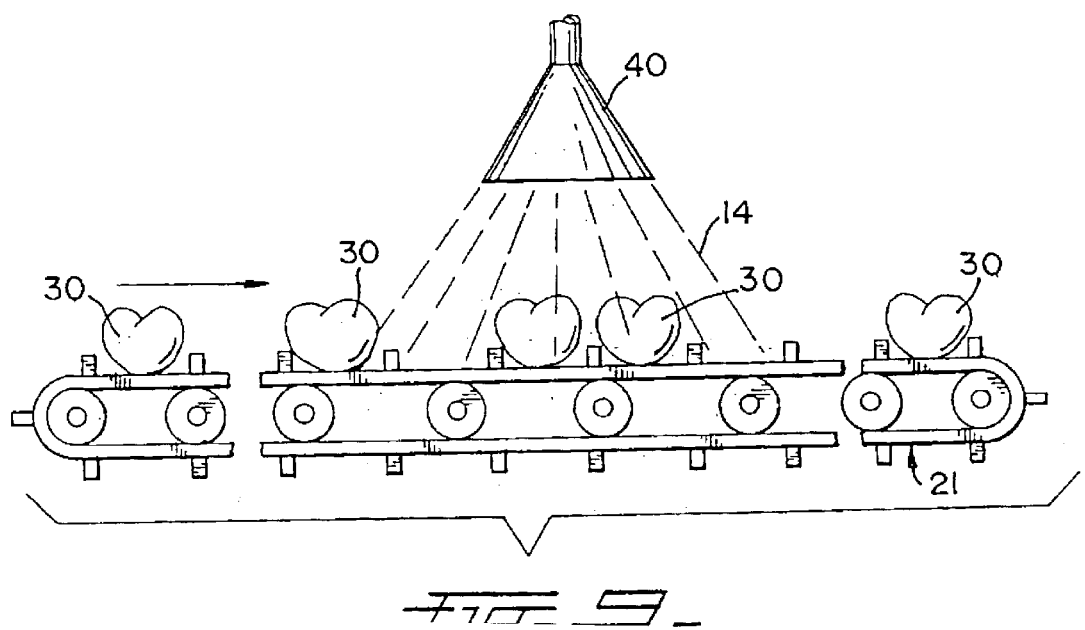
FIG. 9 is a side view of a spray application system.

As best seen in FIGS. 8 and 9, the solution 14 is applied to the fresh fruit, flower or vegetable specimens 30 via a suitable bathing technique, spray technique or any other application technique which will occur to those of skill in the art.

For embodiments where the solution is extracted from dried flowering plant parts, vegetable or fruit peels, FIGS. 10–12 illustrate a system and process for drying the subject flower, plant, vegetable or fruit parts 15 in a commercial drying unit (FIG. 10), mixing same with an aqueous ethyl alcohol solution (FIG. 11), and filtering same into receptacle 7, yielding solution 14 for the preservation of fresh flowers, fruits and vegetables without the requirement of refrigeration.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A solution to be applied to fruits, flowers and vegetables to prolong the shelf life thereof, comprising:
   juice extracted from the fruit, flower or vegetable to be preserved;
   a solvent combined therewith; and
   remains of the fresh fruit, flower or vegetable from which the juice was extracted also combined therewith.

2. The solution of claim 1, wherein the solvent extracts enzymes from the remains of the fresh fruit, flower or vegetable from which the juice was extracted, the solution further comprising:
   an application agent for facilitating adhesion of the enzymes to the fresh fruit, flower or vegetable to be preserved.

3. The solution of claim 2, wherein the application agent comprises wax.

4. A solution that extends the shelf life of fruits, flowers and vegetables comprising:
   enzymes from said fruit, flower and/or vegetable after having been removed from said fruit, flower or vegetable; and
   an application agent for facilitating the adhesion of the enzymes to the fruit, flower or vegetable.

5. A method of making a solution that extends the shelf life of flowers, fruits and vegetables comprising:
   extracting juice from a flower or flowering plant, fruit or vegetable from the group of flowers, fruits and vegetables consisting of cactus/cactus plants, limes, garlic, onions, oranges, grapefruits, lemons, tangerines, pineapples;
   filtering the juice;
   disintegrating flower, fruit or vegetable parts from which the juice has been extracted;
   adding the disintegrated parts to a solvent;
   stirring;
   filtering; and
   combining the juice with the solvent.

6. The method as described in claim 5 wherein the juice is filtered immediately after the extracting step.

7. The method described in claim 5, wherein the solvent is a 10% aqueous ethyl-alcohol solution.

8. The method as described in claim 5, wherein said stirring is conducted for at least one hour.

9. The method as described in claim 5, wherein said filtering is accomplished by vacuum filtering.

10. A flower, fruit or vegetable solution made by the method described in claim 5.

11. A method of extending the shelf life of flowers, fruits and vegetables by applying the solution described in claim 5 to the flower, fruit or vegetable.

12. The method of claim 5, wherein the solvent extracts enzymes from the disintegrated parts, the method further comprising:
    adding an application agent to the combined juice and solvent to facilitate adhesion of the enzymes to the fruit, flower or vegetable to be preserved.

13. The method of claim 12, wherein the application agent comprises wax.

14. A process for making a natural solution that slows down the natural enzymatic changes that occur in fresh flowers, fruits and vegetables after they are harvested, wherein the process results in the extension of the shelf life of fresh flowers, fruits and vegetables without the use of refrigeration, the process comprising:
    extracting juice from a flower, flowering plant, fruit or vegetable from the group consisting of cactus, limes, garlic, onions, oranges, grapefruit, lemons, tangerines and pineapples;
    filtering the juice;
    disintegrating parts the flowering plant, flowers, fruits or vegetables fro which the juice has been extracted;
    adding the disintegrated parts to a ten percent (10%) aqueous ethyl alcohol quantity;
    stirring the parts in ethyl alcohol for a sufficient period of time to mix same and vacuum filtering same; and
    adding the juice to the ethyl alcohol in a ratio of approximately 5 to 1.

15. A flower, fruit or vegetable solution made by the method described in claim 14.

16. A method of extending the shelf life of flowers, fruits and vegetables without refrigeration by applying the solution described in claim 13 comprising:
    wetting the surface of the flower, fruit or vegetable for a period of approximately 60 seconds with the solution made by the method described in claim 14.

17. The method of claim 16 wherein the solution is made from a plurality of different flowers, fruits or vegetables.

* * * * *